(12) United States Patent
Chin et al.

(10) Patent No.: US 10,033,260 B2
(45) Date of Patent: Jul. 24, 2018

(54) BOOST DEVICES WITH ACTIVE DIODES AND SWITCH-MODE CONVERTERS THEREOF

(71) Applicant: VANGUARD INTERNATIONAL SEMICONDUCTOR CORPORATION, Hsinchu (TW)

(72) Inventors: Yu-Lung Chin, Tainan (TW); Shin-Cheng Lin, Tainan (TW); Wen-Hsin Lin, Jhubei (TW); Yu-Hao Ho, Keelung (TW)

(73) Assignee: VANGUARD INTERNATIONAL SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/957,163

(22) Filed: Dec. 2, 2015

(65) Prior Publication Data
US 2017/0054369 A1  Feb. 23, 2017

(30) Foreign Application Priority Data
Aug. 20, 2015 (TW) .............................. 104127102 A (51) Int. Cl.
*H02M 3/158* (2006.01)
*H02M 1/08* (2006.01)
(Continued)

(52) U.S. Cl.
CPC ................ *H02M 1/08* (2013.01); *G05F 1/61* (2013.01); *G05F 1/62* (2013.01); *H02M 3/1582* (2013.01);
(Continued)

(58) Field of Classification Search
CPC ...................................................... H02M 3/158
(Continued)

(56) References Cited

U.S. PATENT DOCUMENTS 7,145,316 B1 * 12/2006 Galinski, III ......... H02M 3/156
323/224
2003/0193364 A1 * 10/2003 Liu ...................... H02M 3/1588
327/536
(Continued)

FOREIGN PATENT DOCUMENTS

CN         1914787 A      2/2007
CN       101232241 A      7/2008
(Continued)

*Primary Examiner* — Nguyen Tran
*Assistant Examiner* — Trinh Q Dang
(74) *Attorney, Agent, or Firm* — Birch, Stewart, Kolasch & Birch, LLP (57) ABSTRACT

A switch-mode converter includes a high-side driver, a high-side transistor, a low-side driver, a low-side transistor, a capacitor, and an active diode. The high-side driver is supplied by the bootstrap voltage of the bootstrap node and a floating reference voltage of a floating reference node, and generates the high-side output signal. The high-side transistor provides an input voltage to the floating reference node according to the high-side output signal. The low-side driver generates the low-side output signal. The low-side transistor couples the floating reference node to a ground according to the low-side output signal. The capacitor is coupled between the bootstrap node and the floating reference node. The active diode provides the supply voltage to the bootstrap node. When the bootstrap voltage exceeds the supply voltage, the active diode isolates the supply voltage from the bootstrap node.

14 Claims, 10 Drawing Sheets

(51) Int. Cl.
*G05F 1/61* (2006.01)
*G05F 1/62* (2006.01)

(52) U.S. Cl.
CPC ....... *H02M 3/1584* (2013.01); *H02M 3/1588* (2013.01); *Y02B 70/1466* (2013.01)

(58) Field of Classification Search
USPC ........................................................ 323/271
See application file for complete search history.

(56) References Cited

U.S. PATENT DOCUMENTS

| | | | | |
|---|---|---|---|---|
| 2012/0176162 | A1* | 7/2012 | Heck | H03K 17/063 327/77 |
| 2013/0002313 | A1* | 1/2013 | Hosokawa | H02M 3/1588 327/109 |
| 2013/0241621 | A1* | 9/2013 | Forghani-Zadeh | H03K 17/08122 327/315 |
| 2014/0049238 | A1* | 2/2014 | Hu | G01R 19/00 323/282 |
| 2015/0311891 | A1* | 10/2015 | Kuo | H03K 17/145 327/390 |

FOREIGN PATENT DOCUMENTS

| | | |
|---|---|---|
| CN | 101247080 A | 8/2008 |
| CN | 202150796 U | 2/2012 |
| CN | 102904565 A | 1/2013 |
| TW | 200845544 A | 11/2008 |
| TW | 201145775 A1 | 12/2011 |
| TW | 201424233 A | 6/2014 |
| TW | 201505341 A | 2/2015 |
| WO | 01/52396 A2 | 7/2001 |

\* cited by examiner

BOOST DEVICES WITH ACTIVE DIODES AND SWITCH-MODE CONVERTERS THEREOF

CROSS REFERENCE TO RELATED APPLICATIONS

This application claims priority of Taiwan Patent Application No. 104127102, filed on Aug. 20, 2015, the entirety of which is incorporated by reference herein.

BACKGROUND OF THE INVENTION

Field of the Invention

The disclosure relates generally to switch-mode converters and boost devices, and more particularly it relates to switch-mode converters and boost devices utilizing a modified transistor as a bootstrap diode.

Description of the Related Art

Figure 1:
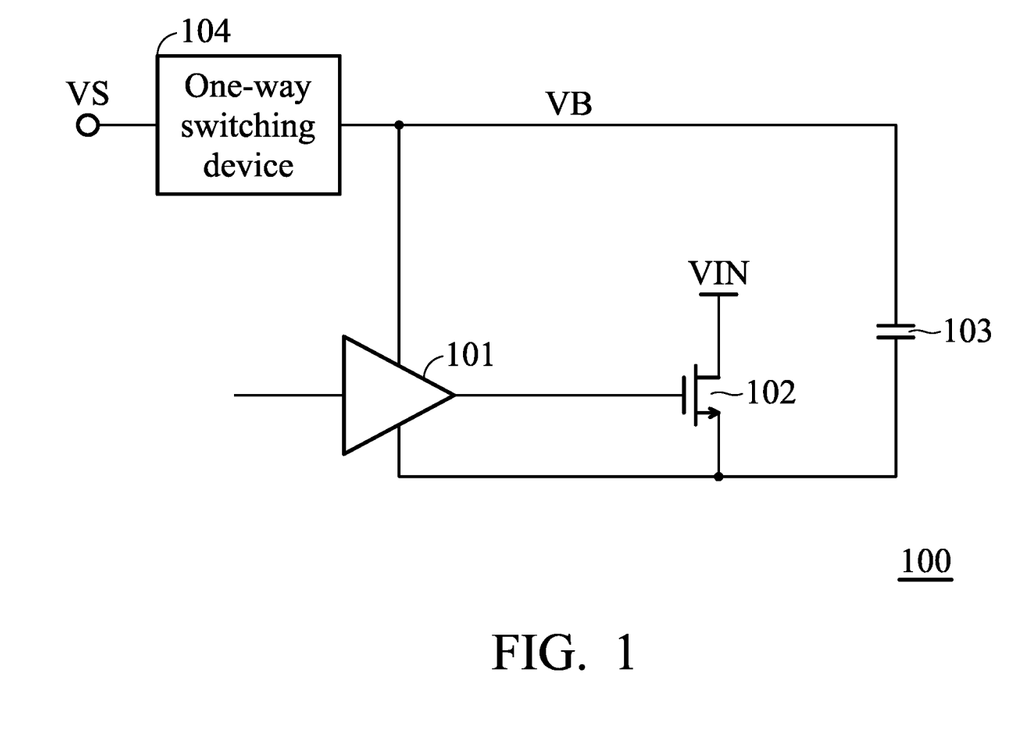
FIG. 1 shows a block diagram of the high-side driving circuit of a switch-mode converter in accordance with an embodiment of the invention.

In the application of switch-mode converters, the assistance of a one-way switching device and a capacitor is generally required to make the high-side transistor be fully conducted. FIG. 1 shows a block diagram of the high-side driving circuit of a switch-mode converter in accordance with an embodiment of the invention. As shown in FIG. 1, the high-side driving circuit 100 includes the high-side driver 101, the high-side transistor 102, the one-way switching device 104, and the capacitor 103. Since the input voltage VIN exceeds the supply voltage VS and the high-side transistor 102 is an N-type transistor, the one-way switching device 104 and the capacitor 103 are configured to boost the bootstrap voltage VB to the sum of the input voltage VIN and the supply voltage VS for keeping the high-side transistor 102 continuously conducted.

In addition, the one-way switching device 104 is not only configured to provide sufficient forward current from the supply voltage VS to the capacitor 103, but it is also configured to isolate the reverse current from the boosted bootstrap voltage VB to the supply voltage VS. Therefore, we need the one-way switching device 104 to be efficient and able to be integrated into the integrated circuit for improving the efficiency of circuits and reducing the cost of production.

BRIEF SUMMARY OF THE INVENTION

For solving above problems, the invention provides a boost device and a switch-mode converter with the boost device for improving the efficiency and performance of circuits.

In an embodiment, a switch-mode converter comprises a high-side driver, a high-side transistor, a low-side driver, a low-side transistor, a capacitor, and an active diode. The high-side driver is supplied by a bootstrap voltage of a bootstrap node and a floating reference voltage of a floating reference node, and generates a high-side output signal. The high-side transistor provides an input voltage to the floating reference node according to the high-side output signal. The low-side driver generates a low-side output signal. The low-side transistor couples the floating node to a ground according to the low-side output signal. The capacitor is coupled between the bootstrap node and the floating reference node. The active diode provides a supply voltage to the bootstrap node. When the bootstrap voltage exceeds the supply voltage, the active diode isolates the supply voltage from the bootstrap node according to a control signal.

According to an embodiment of the switch-mode converter, the switch-mode converter further comprises a control logic. The control logic is supplied by the supply voltage and generates a high-side driving signal and a low-side driving signal to the high-side driver and the low-side driver, respectively, according to an input signal.

According to an embodiment of the switch-mode converter, the high-side driver further comprises: a first P-type transistor and a first N-type transistor. The source terminal of the first P-type transistor is coupled to the bootstrap node. The drain terminal of the first P-type transistor generates the high-side output signal. The gate terminal of the first P-type transistor receives the high-side driving signal. The source terminal of the first N-type transistor is coupled to the floating reference node. The drain terminal of the first N-type transistor generates the high-side output signal. The gate terminal of the first N-type transistor receives the high-side driving signal.

According to an embodiment of the switch-mode converter, the low-side driver further comprises: a second P-type transistor and a second N-type transistor. The source terminal of the second P-type transistor is supplied by the supply voltage. The drain terminal of the second P-type transistor generates the low-side output signal. The gate terminal of the second P-type transistor receives the low-side driving signal. The source terminal of the second N-type transistor is coupled to the ground. The drain terminal of the second N-type transistor generates the low-side output signal. The gate terminal of the second N-type transistor receives the low-side driving signal.

According to an embodiment of the switch-mode converter, the active diode is a normally-ON transistor, wherein, when the floating reference node is coupled to the ground, the normally-ON transistor determines a forward current flowing from the supply voltage to the capacitor according to the control voltage, such that the capacitor stores a voltage difference, wherein, when the input voltage is applied to the floating reference node, the normally-ON transistor further isolates the supply voltage from the bootstrap node according to the control voltage.

According to an embodiment of the switch-mode converter, the active diode is an N-type depletion transistor.

According to another embodiment of the switch-mode converter, the active diode is a P-type depletion transistor.

According to yet another embodiment of the switch-mode converter, the active diode is an N-type junction field-effect transistor.

According to yet another embodiment of the switch-mode converter, the active diode is a P-type junction field-effect transistor.

In an embodiment, a boost device comprises a capacitor and an active diode. The capacitor comprises a first node and a second node. The second node alternately receives a first voltage and a second voltage. The active diode provides a supply voltage to the first node, and isolates the first node from the supply voltage according to a control voltage. The supply voltage is less than the second voltage, and the supply voltage exceeds the first voltage.

According to an embodiment of the boost device, the active diode is a normally-ON transistor. When the second node is supplied by the first voltage, the normally-ON transistor provides the supply voltage to the first node for charging the capacitor. When the second node is supplied by the second voltage, the normally-ON transistor isolates the supply voltage from the first node according to the control voltage.

According to an embodiment of the boost device, when the second node is supplied by the first voltage, the normally-ON transistor determines a forward current flowing from the supply voltage to the capacitor according to the control voltage, such that the capacitor stores the voltage difference. When the second node is supplied by the second voltage, the voltage of the first node is the sum of the second voltage and the voltage difference, and the normally-ON transistor further isolates, according to the control voltage, the supply voltage from the first node to prevent the capacitor from discharging to the supply voltage. The voltage difference is the supply voltage minus the first voltage.

According to an embodiment of the boost device, the active diode is an N-type transistor.

According to another embodiment of the boost device, the active diode is a P-type depletion transistor.

According to yet another embodiment of the boost device, the active diode is an N-type junction field-effect transistor.

According to yet another embodiment of the boost device, the active diode is a P-type junction field-effect transistor.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
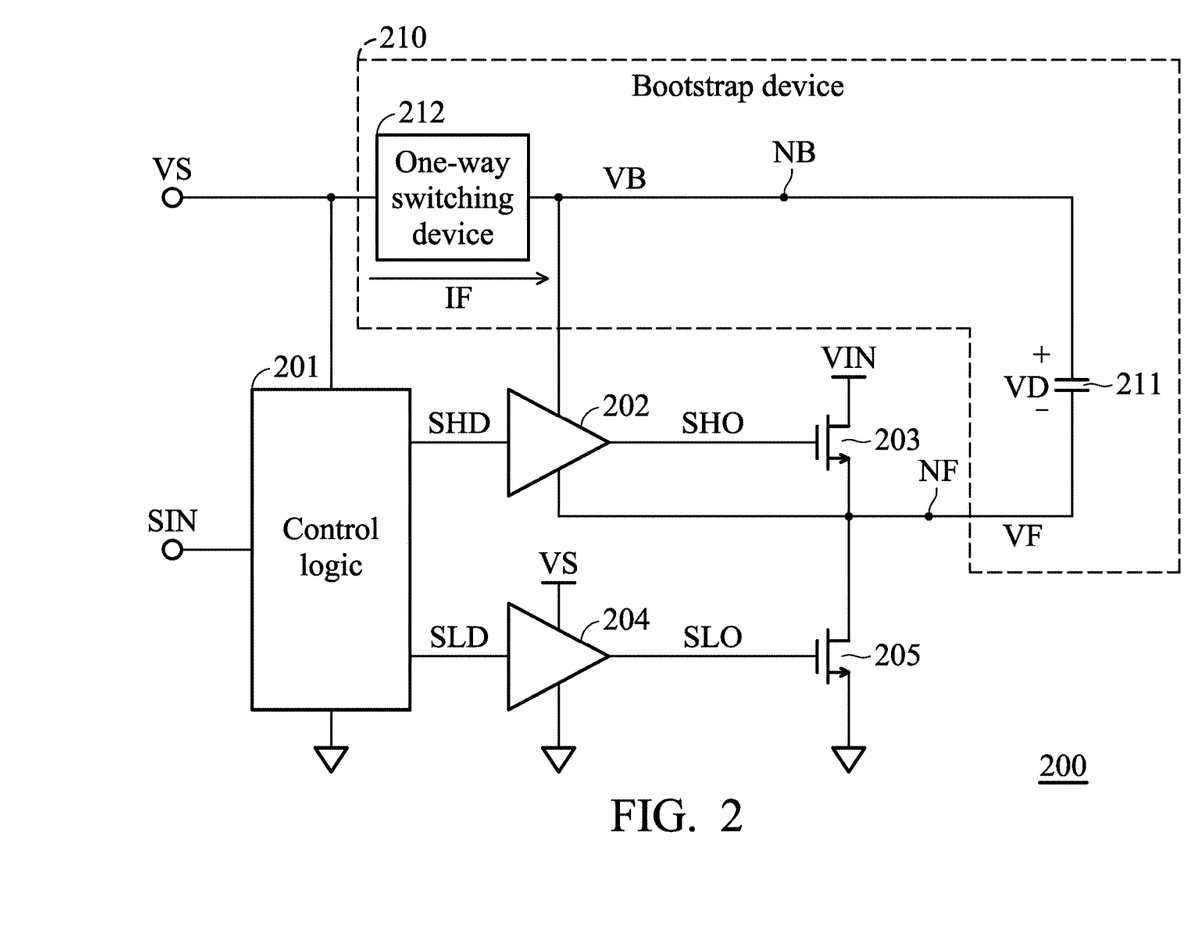
FIG. 2 is a block diagram of a switch-mode converter in accordance with an embodiment of the invention.

FIG. 2 is a block diagram of a switch-mode converter in accordance with an embodiment of the invention. As shown in FIG. 2, the switch-mode converter 200 includes the control logic 201, the high-side driver 202, the high-side transistor 203, the low-side driver 204, the low-side transistor 205, and the bootstrap device 210, in which the input voltage VIN exceeds the supply voltage VS.

According to an embodiment of the invention, the switch-mode converter 200 is a half-bridge driver. According to another embodiment of the invention, the switch-mode converter 200 is a switch-mode buck converter. According to other embodiments of the invention, the switch-mode converter 200 is any other type of converter, in which the input voltage VIN exceeds the supply voltage VS.

As shown in FIG. 2, the control logic 201, which is supplied by the supply voltage VS, generates the high-side driving signal SHD to the high-side driver 202 and the low-side driving signal SLD to the low-side driver 204, according to the input signal SIN. The high-side driver 202 receives the bootstrap voltage VB of the bootstrap node NB and the floating reference voltage VF of the floating reference node NF, and generates, according to the high-side driving signal SHD, the high-side output signal SHO to control the high-side transistor 203. According to an embodiment of the invention, the voltage level of the high-side output signal SHO is between the bootstrap voltage VB and the floating reference voltage VF.

The low-side driver 204 is supplied by the supply voltage VS and generates, according to the low-side driving signal SLD, the low-side output signal SLO to control the low-side transistor 205. According to an embodiment of the invention, when the low-side driver 204 controls the low-side transistor 205 to be turned ON by the low-side output signal SLO, the high-side driver 202 controls the high-side transistor 203 to be turned OFF by the high-side output signal SHO. The floating reference node NF is coupled to the ground through the low-side transistor 205, such that the floating reference voltage VF is 0V. The high-side driver 202 and the low-side driver 204 will be described in the following description.

According to another embodiment of the invention, when the low-side driver 204 controls the low-side transistor 205 to be turned OFF, the high-side driver 202 controls the high-side transistor 203 to be turned ON for supplying the input voltage VIN to the floating reference node NF, such that the floating reference voltage VF is equal to the input voltage VIN. Since the high-side transistor 203 and the low-side transistor 205 are made by an identical device, the boost device 210 boosts the bootstrap voltage VB to the sum of the supply voltage VS and the input voltage VIN for keeping an identical gate-drain voltage in each of the high-side transistor 203 and low-side transistor 205.

As shown in FIG. 2, the boost device 210 includes the capacitor 211 and the one-way switching device 212. The capacitor 211 is coupled between the bootstrap node NB and the floating reference node NF and stores a voltage difference VD. The one-way switching device 212 is coupled between the supply voltage VS and the bootstrap node NB. According to an embodiment of the invention, when the bootstrap voltage VB is less than the supply voltage VS, the one-way switching device 212 generates the forward current IF flowing from the supply voltage VS to the bootstrap node NB.

According to another embodiment of the invention, when the bootstrap voltage VB exceeds the supply voltage VS, the one-way switching device 212 isolates the supply voltage VS from the bootstrap node NB for preventing the supply voltage VS from the excessively high bootstrap voltage VB from breaking down other circuits. The boost device 210 will be described in the following description.

Figure 3:
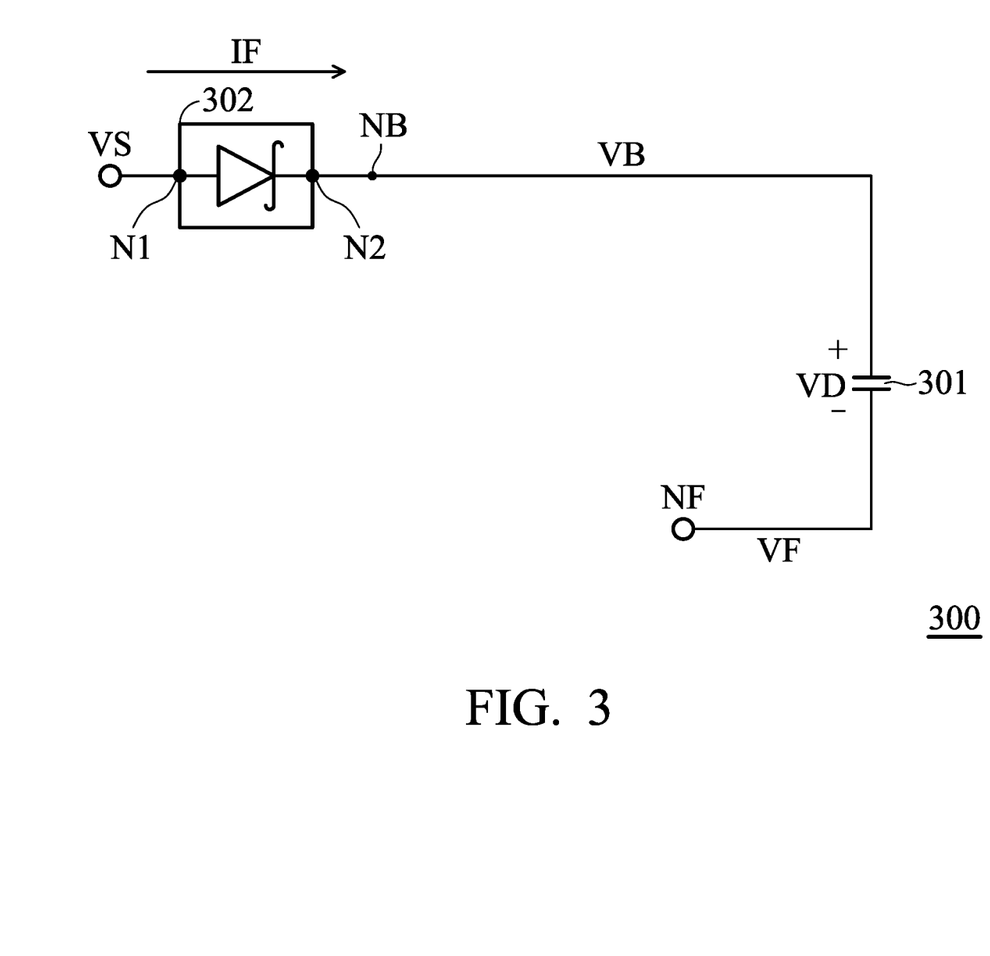
FIG. 3 is a schematic diagram of a boost device in accordance with an embodiment of the invention.

FIG. 3 is a schematic diagram of a boost device in accordance with an embodiment of the invention. As shown in FIG. 3, the boost device 300 includes the capacitor 301 and the Schottky diode 302, in which the Schottky diode 302 includes the anode terminal N1 and the cathode terminal N2. The anode terminal N1 receives the supply voltage VS, and the cathode terminal N2 is coupled to the bootstrap node NB. Compared to FIG. 2, the one-way switching device 212 is replaced by the Schottky diode 302.

According to an embodiment of the invention, when the floating reference node NF is coupled to the ground, the supply voltage VS exceeds the bootstrap voltage VB and the Schottky diode 302 is turned ON, such that the supply voltage VS charges the capacitor 301 and the voltage difference VD stored in the capacitor 301 is the supply voltage VS. When the input voltage VIN is applied to the floating reference node NF through the high-side transistor 203 in FIG. 2, the floating reference voltage VF is equal to the input voltage VIN. Since the voltage difference stored in the capacitor 301 is the supply voltage VS, the bootstrap voltage VB is the sum of the supply voltage and the input voltage VIN.

For increasing the forward current IF of the Schottky diode 302 flowing to the capacitor 301, the contact area between the metal layer and the doping layer of the Schottky diode 302 should be increased. However, after increasing the contact area between the metal layer and the doping layer, the reverse current of the Schottky diode 302 is increased accordingly, such that the Schottky diode 302 is not able to effectively isolate the bootstrap voltage VB from the supply voltage VS when the bootstrap voltage VB exceeds the supply voltage VS. Therefore, even though the Schottky diode 302 can be utilized as the one-way switching device 212, the performance of the Schottky diode 302 is limited due to the limitations of a Schottky diode's physical characteristics.

Figure 4:
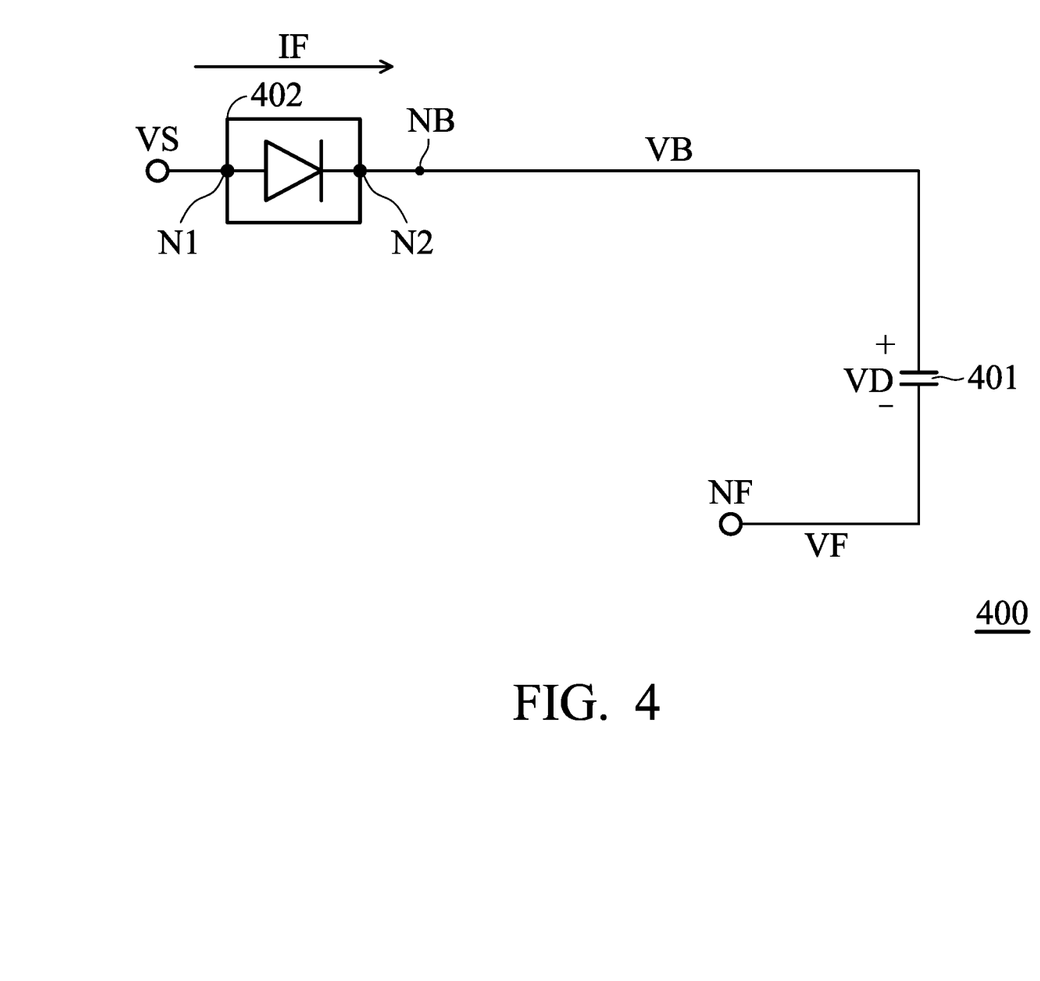
FIG. 4 is a schematic diagram of a boost device in accordance with another embodiment of the invention.

FIG. 4 is a schematic diagram of a boost device in accordance with another embodiment of the invention. As shown in FIG. 4, the boost device 400 includes the capacitor 401 and the body-isolated diode 402, in which the body-isolated diode 402 includes the anode terminal N1 and the cathode terminal N2. The anode terminal N1 receives the supply voltage VS, and the cathode terminal N2 is coupled to the bootstrap terminal NB. Compared to FIG. 2, the one-way switching device 212 is replaced by the body-isolated diode 402.

Even though the body-isolated diode 402 provides better isolation performance than the Schottky diode 302 does, a power loss may be caused by part of the forward current IF, which flows from the supply voltage VS to the capacitor 401, flowing to the P-type substrate when the body-isolated diode 402 is forward-biased, since the body-isolated diode 402 is placed upon the P-type substrate.

Figure 5:
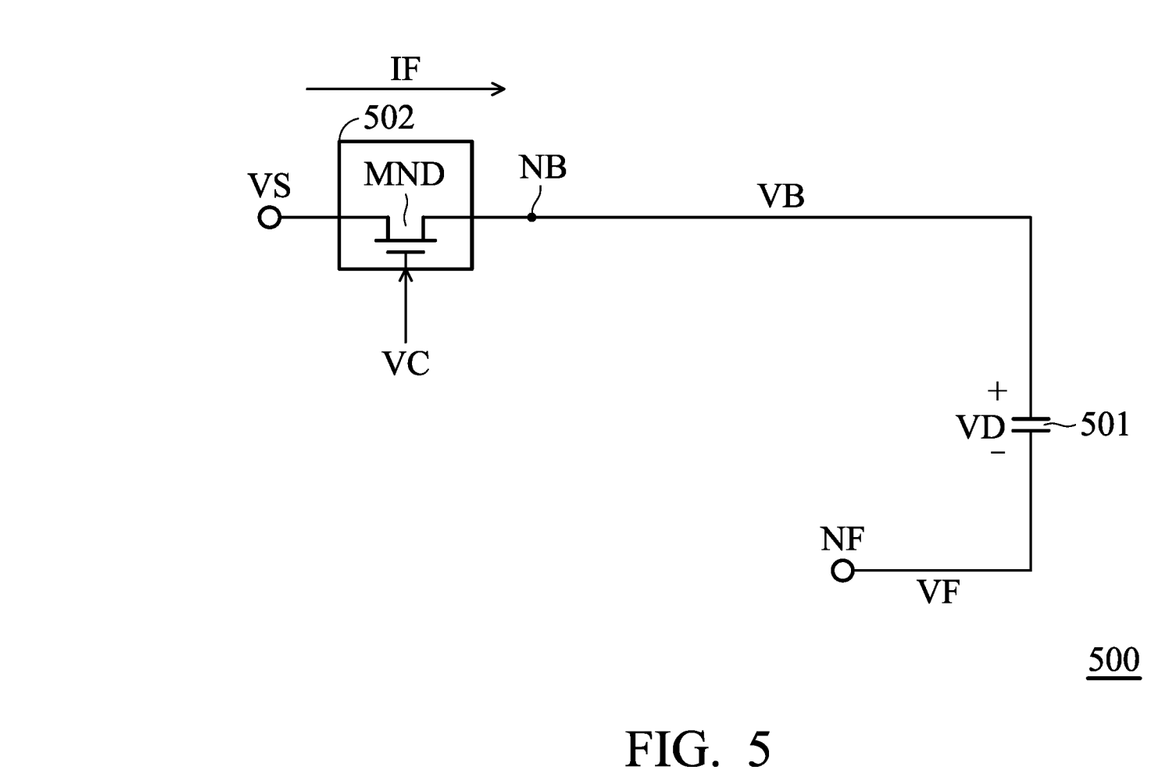
FIG. 5 is a schematic diagram of a boost device in accordance with another embodiment of the invention.

FIG. 5 is a schematic diagram of a boost device in accordance with another embodiment of the invention. As shown in FIG. 5, the boost device 500 includes the capacitor 501 and the active diode 502, in which the active diode 502 is coupled between the supply voltage and the bootstrap node NB and controlled by the control voltage VC. Compared to FIG. 2, the one-way switching device 212 is replaced by the active diode 502.

Figure 9:
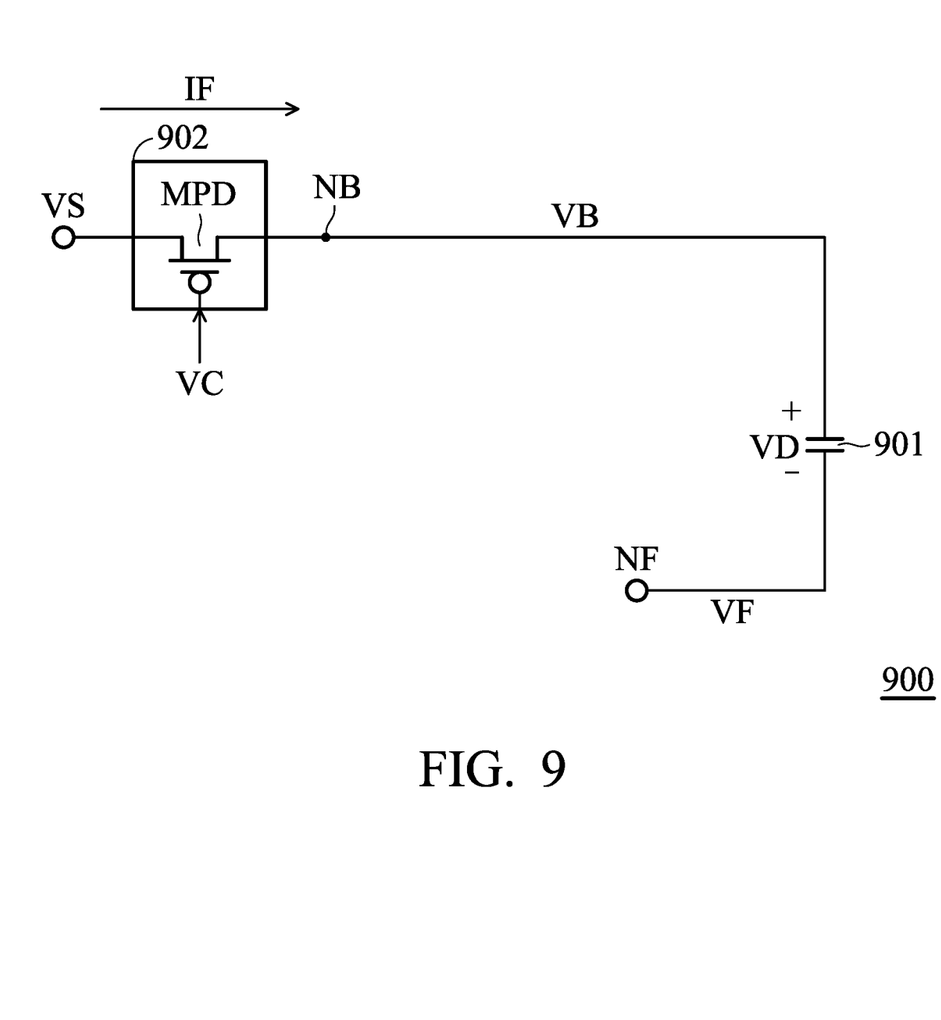
FIG. 9 is a schematic diagram of a boost device in accordance with yet another embodiment of the invention.
Figure 10:
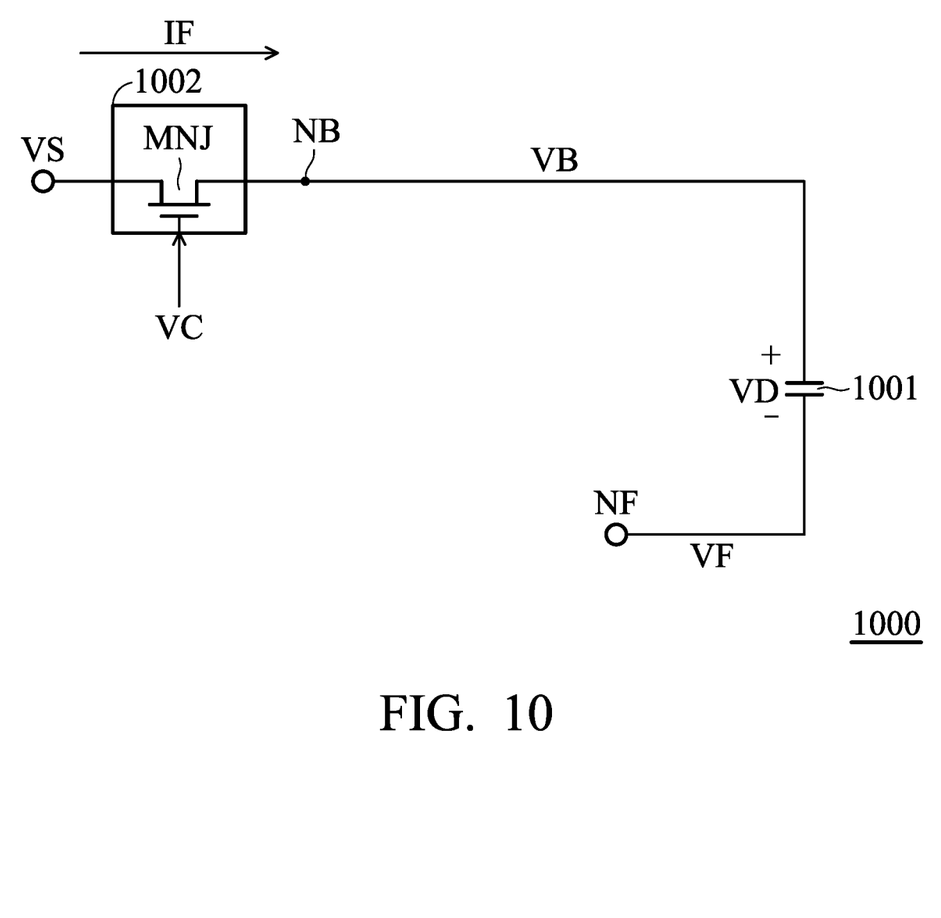
FIG. 10 is a schematic diagram of a boost device in accordance with yet another embodiment of the invention.
Figure 11:
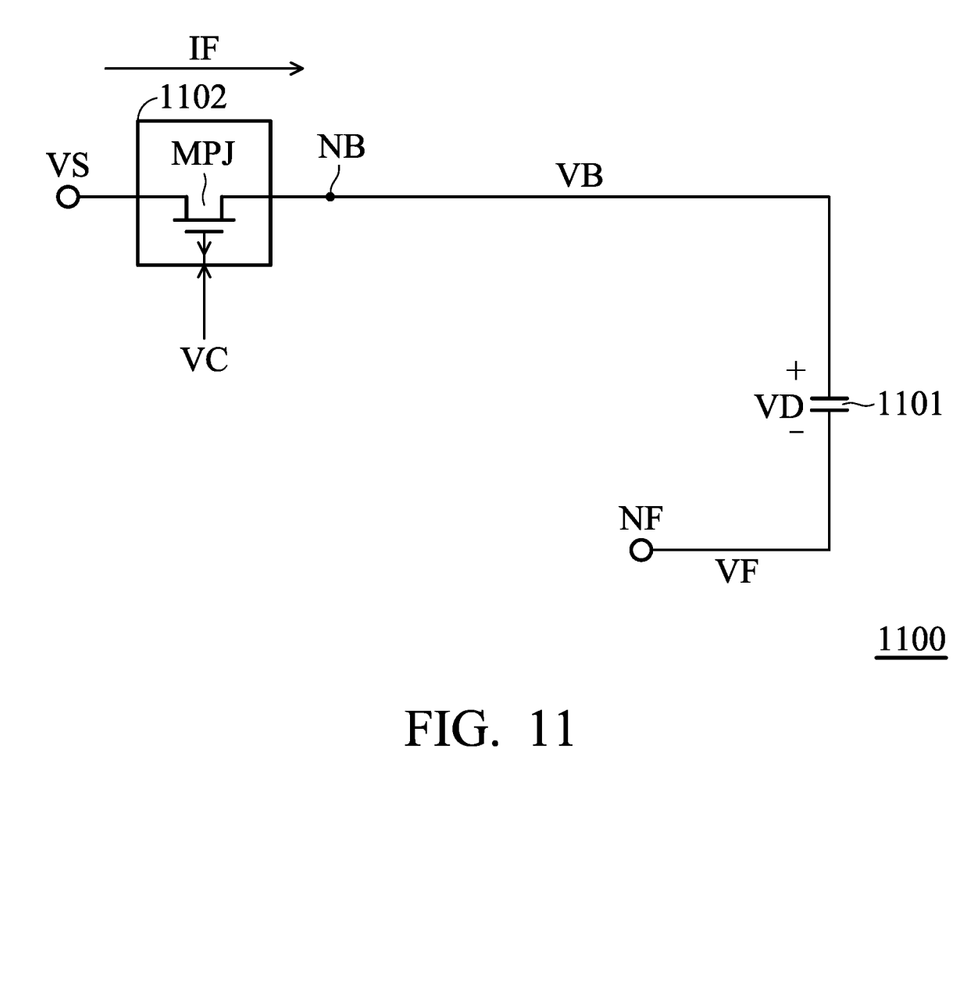
FIG. 11 is a schematic diagram of a boost device in accordance with yet another embodiment of the invention.

According to an embodiment of the invention, the active diode 502 is an N-type (shown in FIG. 5) or P-type (shown in FIG. 9) depletion transistor. According to another embodiment of the invention, the active diode 502 is an N-type (shown in FIG. 10) or P-type (shown in FIG. 11) junction field-effect transistor (JFET). According to other embodiments of the invention, the active diode 502 is a normally-ON transistor which is invented or will be invented in the future.

Figure 6:
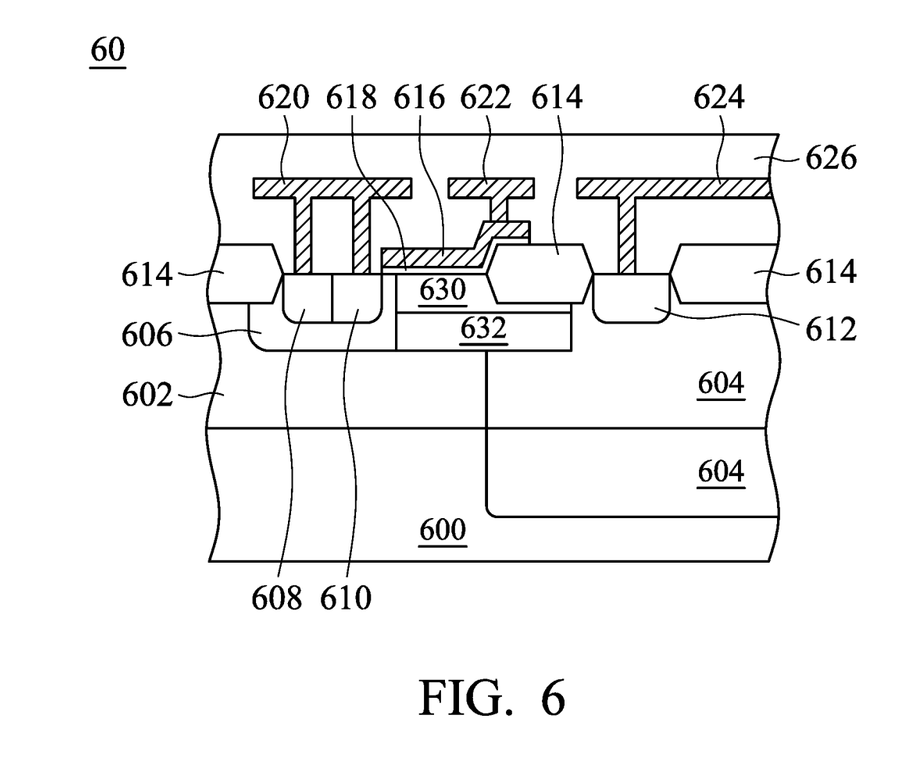
FIG. 6 is a cross-sectional view of a normally-ON transistor in accordance with an embodiment of the invention.

FIG. 6 is a cross-sectional view of a normally-ON transistor in accordance with an embodiment of the invention. The normally-ON transistor 60 is an N-type device and includes a P-type substrate 600 and an epitaxial layer 602 deposed on the P-type substrate 600. According to another embodiment of the invention, the normally-ON transistor 60 may be a P-type device, and the N-type device is illustrated herein but not limited thereto. A gate structure 616 and a field insulating layer 614 are on the epitaxial layer 602. A gate insulating layer 618 is disposed between the gate structure 616 and the field insulating layer 614. A portion of the gate insulating layer 618 extends to cover a portion of the field insulating layer 614.

Moreover, a P-type body region 606 and an N-type well region 604 are respectively disposed in the epitaxial layer 602 on either side of the gate structure 616. The N-type well region 604 is disposed in both the substrate 600 and the epitaxial layer 602. A P-type contact region 608 and an adjacent N-type contact region 610 collectively constitute a source region, which is disposed in the body region 606. An N-type contact region 612 constitutes a drain region and is disposed in the N-type well region 604. Moreover, a P+ doped region 632 is disposed in the N-type well region 604 and extends outside of the N-type well region 604 toward the body region 606. The normally-ON transistor 60 further includes an N+ doped region 430 stacked on the P+ doped region 632. The N+ doped region 630 is also disposed in N-type well region 604 and extends outside of the N-type well region 604 toward the body region 606. In some embodiments of the invention, the N+ doped region 630 and the P+ doped region 632 may be extended to overlap a portion of the body region 606, but are not in contact with the source regions 608/610. In some embodiments of the invention, the N+ doped region 630 and the P+ doped region 632 may be extended outside of the N-type well region 604 but do not overlap the body region 606.

Moreover, the normally-ON transistor 60 further includes a source electrode 620 electrically connected to the P-type contact region 608 and the N-type contact region 610. A drain electrode 624 is electrically connected to the N-type contact region 612. A gate electrode 622 is electrically connected to the gate structure 616. An interlayer dielectric layer 626 is disposed to cover the source electrode 620, the gate electrode 622, and the drain electrode 624.

According to an embodiment of the invention, the active diode 502 in FIG. 5 is the normally-ON transistor 60 in FIG. 6. The source electrode 620 is configured to receive the supply voltage VS in FIG. 5, the drain electrode 624 is coupled to the bootstrap node NB, and the gate electrode 622 is configured to receive the control voltage VC. When the supply voltage VS exceeds the bootstrap voltage VB, the supply voltage VS may unrestrictedly charge the capacitor 501. The turn-on resistance of the normally-ON transistor 60 may be reduced with the control voltage VC increasing, such that the turn-on resistance of the normally-ON transistor 60 may be negligible. When the bootstrap voltage VB exceeds the supply voltage VS, the normally-ON transistor 60 is turned OFF according to the control voltage VC, which prevents the bootstrap voltage VB from charging the supply voltage VS.

According to an embodiment of the invention, since the active diode 502 is a normally-ON transistor, the active diode 502 is turned ON without a bias. In addition, the forward current of the active diode 502 may be controlled by the control voltage VC. When the bootstrap voltage VB exceeds the supply voltage VS, the active diode 502 may also be turned OFF to isolate the supply voltage VS from the bootstrap voltage VB.

The active diode 502 is illustrated as an N-type depletion transistor MND to describe the invention in detail. When the supply voltage VS exceeds the bootstrap voltage VB and the control voltage VC is equal to 0V, the N-type depletion transistor MND supplies the supply voltage VS to the bootstrap node NB due to the physical characteristics of the N-type depletion transistor MND. With the control voltage VC increasing, the forward current IF flowing from the supply voltage VS to the bootstrap node NB through the N-type depletion transistor MND is increasing accordingly.

When the bootstrap voltage VB exceeds the supply voltage VS, the N-type depletion transistor MND may be turned OFF by increasing the control voltage VC until the difference of the control voltage VC minus the supply voltage VS is less than the threshold voltage of the N-type depletion transistor MND, such that the supply voltage VS is isolated from the bootstrap node NB.

According to an embodiment of the invention, when the supply voltage VS exceeds the bootstrap voltage VB, the control voltage VC is equal to 0V to turn ON the N-type depletion transistor MND. According to another embodiment of the invention, when the supply voltage VS is less than the bootstrap voltage VB, the control voltage VC is equal to the supply voltage VS, such that the N-type depletion transistor MND is turned OFF to isolate the supply voltage VS from the bootstrap node NB.

According to an embodiment of the invention, since the one-way switching device is a depletion transistor or a JFET, the one-way switching device may be integrated in the integrated circuits to reduce cost. In addition, due to the physical characteristics of the depletion transistors and the JFETs, the designer is able to effectively control the reverse current of the one-way switching device by the control voltage, and also able to control the current driving capability of the forward current of the one-way switching device by the control voltage VC.

Figure 7:
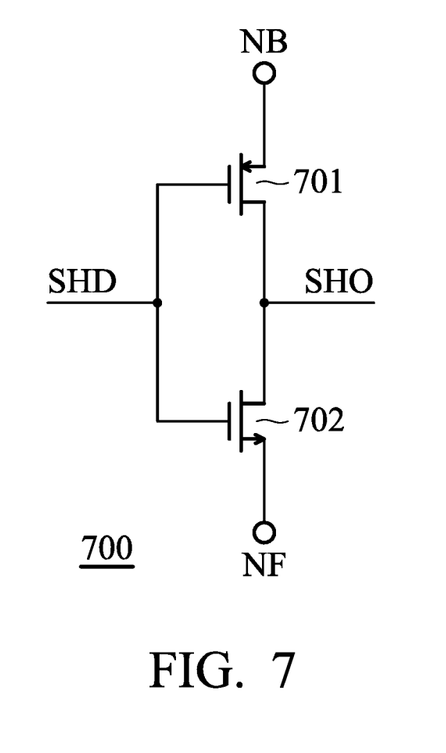
FIG. 7 is a schematic diagram of the high-side driver in FIG. 2 in accordance with another embodiment of the invention.

FIG. 7 is a schematic diagram of the high-side driver in FIG. 2 in accordance with another embodiment of the invention. As shown in FIG. 7, the high-side driver 700 includes the first P-type transistor 701 and the first N-type transistor 702. The source terminal of the first P-type transistor 701 is coupled to the bootstrap node NB, the drain terminal of the first P-type transistor 701 outputs the high-side output signal SHO, and the gate terminal of the first P-type transistor 701 receives the high-side driving signal SHD. The source terminal of the first N-type transistor 702 is coupled to the floating reference node NF, the drain terminal of the first N-type transistor 702 is coupled to the high-side output signal SHO, and the gate terminal of the first N-type transistor 702 receives the high-side driving signal SHD.

Figure 8:
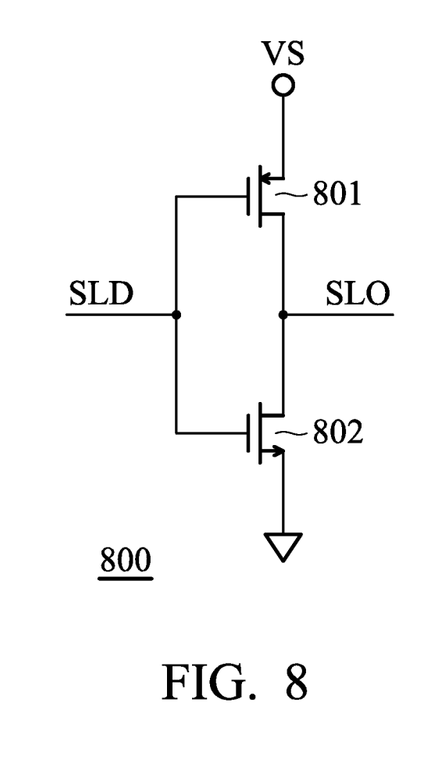
FIG. 8 is a schematic diagram of the low-side driver in FIG. 2 in accordance with another embodiment of the invention.

FIG. 8 is a schematic diagram of the low-side driver in FIG. 2 in accordance with another embodiment of the invention. As shown in FIG. 8, the low-side driver 800 includes the second P-type transistor 801 and the N-type transistor 802. The source terminal of the second P-type transistor 801 receives the supply voltage VS, the drain terminal of the second P-type transistor 801 outputs the low-side output signal SLO, and the gate terminal of the second P-type transistor 801 receives the low-side driving signal SLD. The source terminal of the second N-type transistor 802 is coupled to the ground, the drain terminal of the second N-type transistor 802 outputs the low-side output signal SLO, and the gate terminal of the second N-type transistor 802 receives the low-side driving signal SLD.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A switch-mode converter, comprising:
   a high-side driver, supplied by a bootstrap voltage of a bootstrap node and a floating reference voltage of a floating reference node, and generating a high-side output signal;
   a high-side transistor, providing an input voltage to the floating reference node according to the high-side output signal;
   a low-side driver, generating a low-side output signal;
   a low-side transistor, coupling the floating reference node to a ground according to the low-side output signal;
   a capacitor, coupled between the bootstrap node and the floating reference node; and
   an active diode, providing a supply voltage to the bootstrap node, wherein, when the bootstrap voltage exceeds the supply voltage, the active diode isolates the supply voltage from the bootstrap node according to a control voltage, wherein the active diode is a normally-ON transistor, wherein, when the floating reference node is coupled to the ground, the normally-ON transistor determines a forward current flowing from the supply voltage to the capacitor according to the control voltage, such that the capacitor stores a voltage difference, wherein, when the input voltage is applied to the floating reference node, the normally-ON transistor further isolates the supply voltage from the bootstrap node according to the control voltage,
   wherein with the control voltage increasing, the forward current flowing from the supply voltage to the bootstrap node through the active diode is increasing accordingly.

2. The switch-mode converter of claim 1, further comprising:
   a control logic, supplied by the supply voltage and generating a high-side driving signal and a low-side driving signal to the high-side driver and the low-side driver respectively, according to an input signal.

3. The switch-mode converter of claim 1, wherein the active diode is an N-type depletion transistor.

4. The switch-mode converter of claim 1, wherein the active diode is a P-type depletion transistor.

5. The switch-mode converter of claim 1, wherein the active diode is an N-type junction field-effect transistor.

6. The switch-mode converter of claim 1, wherein the active diode is a P-type junction field-effect transistor.

7. The switch-mode converter of claim 2, wherein the high-side driver further comprises:
   a first P-type transistor, the source terminal coupled to the bootstrap node, the drain terminal generating the high-side output signal, and the gate terminal receiving the high-side driving signal; and
   a first N-type transistor, the source terminal coupled to the floating reference node, the drain terminal generating the high-side output signal, and the gate terminal receiving the high-side driving signal.

8. The switch-mode converter of claim 2, wherein the low-side driver further comprises:

a second P-type transistor, the source terminal supplied by the supply voltage, the drain terminal generating the low-side output signal, and the gate terminal receiving the low-side driving signal; and a second N-type transistor, the source terminal coupled to the ground, the drain terminal generating the low-side output signal, and the gate terminal receiving the low-side driving signal.

9. A boost device, comprising:

a capacitor, coupled between a bootstrap node and a floating reference node, wherein the floating reference node alternately receives reference voltage of a ground and an input voltage; and an active diode, providing a supply voltage to the bootstrap node and isolating the bootstrap node from the supply voltage according to a control voltage, wherein the supply voltage is less than the input voltage, and the supply voltage exceeds the reference voltage, wherein the active diode is a normally-ON transistor, wherein, when the floating reference node is supplied by the reference voltage, the normally-ON transistor provides the supply voltage to the bootstrap node for charging the capacitor, wherein, when the floating reference node is supplied by the input voltage, the normally-ON transistor isolates the supply voltage from the bootstrap node according to the control voltage, wherein with the control voltage increasing, the forward current flowing from the supply voltage to the bootstrap node through the active diode is increasing accordingly.

10. The boost device of claim 9, wherein, when the floating reference node is supplied by the reference voltage, the normally-ON transistor determines a forward current flowing from the supply voltage to the capacitor according to the control voltage, such that the capacitor stores a voltage difference, wherein, when the floating reference node is supplied by the input voltage, a voltage of the bootstrap node is a sum of the input voltage and the voltage difference, and the normally-ON transistor further isolates, according to the control voltage, the supply voltage from the bootstrap node to prevent the capacitor from discharging to the supply voltage, wherein the voltage difference is the supply voltage minus the reference voltage.

11. The boost device of claim 9, wherein the active diode is an N-type depletion transistor.

12. The boost device of claim 9, wherein the active diode is a P-type depletion transistor.

13. The boost device of claim 9, wherein the active diode is an N-type junction field-effect transistor.

14. The boost device of claim 9, wherein the active diode is a P-type junction field-effect transistor.

* * * * *